J. J. MIZER AND V. JAKOB.
VEHICLE ROLLER JACK.
APPLICATION FILED SEPT. 5, 1919.

1,437,606.

Patented Dec. 5, 1922.
4 SHEETS—SHEET 4.

Patented Dec. 5, 1922.

1,437,606

UNITED STATES PATENT OFFICE.

JOSEPH J. MIZER AND VICTOR JAKOB, OF RACINE, WISCONSIN, ASSIGNORS TO WALKER MANUFACTURING COMPANY, OF RACINE, WISCONSIN, A CORPORATION OF WISCONSIN.

VEHICLE ROLLER JACK.

Application filed September 5, 1919. Serial No. 321,872.

*To all whom it may concern:*

Be it known that we, JOSEPH J. MIZER, a citizen of the United States, and VICTOR JAKOB, a citizen of Germany, residing at Racine. in the county of Racine and State of Wisconsin, have invented certain new and useful Improvements in Vehicle Roller Jacks, of which the following is a specification.

Our invention relates to a vehicle roller jack, and more particularly to a jack adapted to shift vehicles around in a garage having a relatively long, horizontal frame, preferably comprising a forward base carrying a lifting member and a rear base having suitable mechanism for operating the lifting member, the forward base being the one which is adapted to be pushed under the load to be raised, for example, the axle of an automobile, said bases preferably being mounted on rollers or casters and being spaced far enough apart and rigidly connected by suitable bars so that when the forward base is under the axle of an automobile and the same is raised sufficiently so that the wheels thereof will clear the connecting bars the rear base may be swung around under one of the wheels out of the way and repairs or replacements may be conveniently made.

One of the objects of our invention is to provide an improved jack of this type which may be conveniently operated from a distance clear of the load being lifted, the operating connections of which may be readily shifted out of the way when it is desired to work on the automobile or other load being supported by the jack.

A further object of our invention is to provide improved and novel means in a jack of this type whereby the jack will be capable of a wider range of movement than has been possible to obtain in prior devices, whereby a series of lifting operations may be performed and the object raised to the desired height.

A further object of our invention is to provide in a jack of this type improved, quick acting means for taking up whatever lost motion there may be between the initial position of the lifting member and the object to be raised and for releasing the lifting member so that it may descend to its initial position after the object has been lowered and its weight removed therefrom, these results preferably being attained by the operation of a single control rod.

A further object of our invention is to provide in a jack of this type improved means for controlling the mechanism which operates to raise and lower the lifting member, the means preferably being operated by a single control rod located, for example, on the operating handle and which may be set in one position to cause the lifting member to be raised, in another position to cause it to be lowered, and in a third position to lock it.

The invention consists of the novel and improved constructions, arrangements and devices to be hereinafter described and claimed for carrying out the above stated objects and such other incidental objects as will appear from the following description.

The invention is illustrated, in certain preferred embodiments, in the accompanying drawings wherein—

Fig. 8 is an elevational view similar to

Fig. 1 showing the parts in the position they assume after the operating handle has made its initial lifting movement.

Figs. 9, 10, 11 and 12 are sectional views, respectively, taken on the lines 9—9, 10—10, 11—11 and 12—12 of Fig. 1, and Figs. 13 and 14 are sectional views, respectively, taken on the lines 13—13 and 14—14 of Fig. 12.

Like characters of reference designate like parts in the several figures of the drawings.

The frame of the jack comprises a forward base member 20 and a rearward base member 21 rigidly connected together by means of the bars 22, the length of the bars being such that when the forward base member is under the axle of an automobile and the wheels thereof raised sufficiently so as to clear the bars the rearward portion of the jack may be swung around underneath one wheel out of the way so that repairs and replacements may be conveniently made.

The forward base member has integrally formed therewith two parallel side members 23 between which the rack guide or carriage 24 and its associated operating mechanism are mounted. The rack carriage is mounted between the horizontal arms 25 of a bell-crank lever 26 being pivotally connected to the shaft 27 which extends through the arms 25. The bell-crank lever is pivotally mounted on the shaft 28 which extends through the side members 23, the lower end of the vertical arm 29 of said lever being pivotally connected to a clevis 30 which is secured to the forward end of a connecting rod 31, the purpose of which will be hereinafter described. The side members 23 are formed with grooves or guideways 32, these guide-ways being formed on a radius equal to the radius of the horizontal arms 25 of the bell-crank lever. The forward side of the rack carriage is provided with a transverse perforation for the reception of a shaft 33 on each end of which a roller 34 is mounted, these rollers being adapted to run in the guide-ways 32. It will thus be seen that when the horizontal arms of the bell-crank lever are forced upwardly the rack carriage will rock on the shaft 27 and be held in a perpendicular position by the rollers 34 operating in the guideways 32.

The rack carriage is in the form of a housing with a rectangular, vertical passageway 35 for the reception of the rack bar 36. On the rear side of the rack carriage two vertical flanges 37 are formed between which a pawl 38 is pivotally mounted, the upper end of the pawl extending through the perforation 39 formed in the rear side of the rack carriage and engaging the teeth 40 formed on the rack bar 36, the pawl normally being held in engagement with said teeth by means of a spring 41. The upper end of the rack bar is provided with a swivel cap 42 which may be of any common construction. One side of the rack carriage is formed with an internal vertical channel 43 in which the pin 44 secured to the rack bar may travel, the channel 43 terminating short of the top of the rack carriage so as to form the stop 45 for the pin 44 thereby limiting the upward movement of the rack bar. One side of the rack carriage is preferably formed with a vertical dove-tailed guide-way 46 for the reception of a rack lifting member 47, the top of which is adapted to bear against the underside of the cap 42. The member 47 is formed with an outwardly projecting lug 48 which is adapted to be engaged by a lifting lever 49, the operation of which will be more fully described hereinafter. A web 50 is preferably formed across the guide-way 46 to form a stop which engages the lug 48 thereby limiting the upward movement of the member 47.

The forward base preferably is mounted on a pair of wheels 51 which are mounted on the ends of the transverse axle 52 supported in the bearing 53 which preferably is cast integrally on the front side of the base member adjacent its lower end.

The rear base member preferably comprises a horizontal T-shaped web portion 54, which may be braced underneath by suitable longitudinal and transverse ribs 55, and a longitudinal upright web portion 56. The base preferably is mounted on casters 57 the housings of which are secured to the web portion 54 by the rivets or bolts 58. On the upper side of the web portion 54 is formed the longitudinal guide-way 59 in which the rack bar 60 is adapted to reciprocate, the rack bar being pivotally connected to the rear end of the connecting rod 31 and formed on its upper side with the teeth 61. As shown in the drawings, the web member 56 is formed with an opening 62 to provide room for the various pawls for operating the jack. The lifting member of the jack is operated by a bell-crank lever 63, the lower portion of which is preferably bifurcated, the arms 64 thereof being adapted to straddle the web portion 56 on which the lever is pivoted at 65. A lifting pawl 66 adapted to engage the teeth on the rack bar 60 is mounted between the power arms 67 of the bell-crank on a pivot 68. A holding pawl 69 also adapted to engage the teeth on the rack bar 60 is mounted on a pivot pin 70 which extends through a depending lug 71 of the web portion 56. A lifting lever 72, the arms 73 of which embrace the arms 67 of the bell-crank lever and are pivotally mounted on the pivot 68, is provided for lifting the holding pawl 69 out of engagement with the teeth 61 of the rack bar 60 when the bell-crank operating lever 63 is operated to lower the load of the jack, one of the arms 73 of the lever 72 being formed with an upstanding perforated lug 74 to which one end of a coil spring 75 is attached, the purpose of this spring being hereinafter explained. The movement of the lever 72 is limited with respect to the lifting pawl 66 this pawl having a small pin or lug 76 projecting laterally from one side through the relatively large perforation 77 formed in the adjacent arm 73 of the lever 72. The upper edge of the rear part of the web member 56 is in the form of a segment formed with a plurality of notches 78 which are adapted to receive the cross-bar of a U-shaped latching member 79 the side arms 80 of which embrace the operating arms 81 of the bell-crank operating lever the arms 80 being pivotally mounted on a pin 82 which extends through the arms 81 of the operating lever. The upper end of the spring 75 is formed so as to provide a slot 83. The latching member 79 is formed with a lug 84 which projects through the slot 83. When the operating lever 63 is in the position shown in Fig. 1 and the latching member 79 is lowered into engagement with one of the notches 78, the lug 84 of the latching member rests in the bottom of the slot 83 the spring 75 not being under tension. However when the operating lever 63 is in the position shown in Fig. 8 and the latching member 79 is raised to its uppermost position, by means to be hereinafter described, the lug 84 will engage the top of the slot 83 thereby placing the spring 75 under tension and raising the lifting lever 72 and the holding pawl 69 to the positions shown in dotted lines when the load is sustained by the pawl 66 which is the case at certain periods of the lowering operation.

Figures 1, 2, 3, 4, 5:
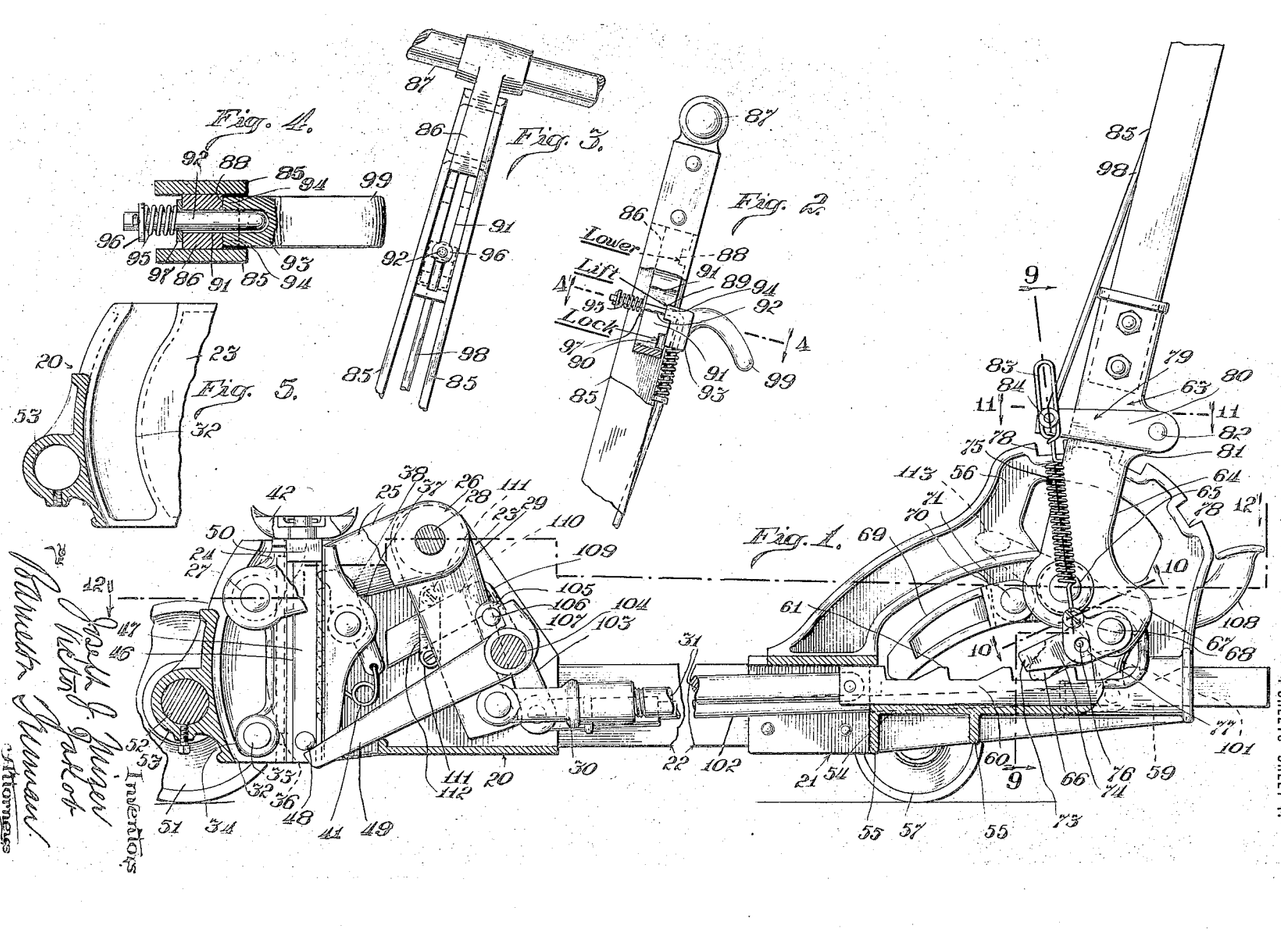
Fig. 1 is a side elevational view of a jack embodying the principles of our invention, certain parts being shown in section, a portion of the connecting bars, connecting rod and pedal control rod being broken out and the operating handle being locked in the lifting position and the upper end thereof broken off.
Fig. 2 is a side elevational view of the upper end of the operating lever, certain parts thereof being shown in section.
Fig. 3 is a front view of that portion of the operating handle shown in Fig. 2.
Fig. 4 is an enlarged sectional view taken on line 4—4 of Fig. 2.
Fig. 5 is a detail view of one side of the forward base showing one of the curved guiding grooves for the rack guide.

The operating handle preferably comprises two bars 85 which are bolted at their lower ends to the operating arm of the bell-crank 63 and at their upper ends to a casting 86 in which a transverse metal handle bar 87 is mounted. The casting 86 extends downwardly between the bars 85 and is formed on the rearward side with three notches 88, 89 and 90, (Fig. 2) which have been legended respectively "Lower" "Lift" and "Lock." As shown in Figs. 3 and 4 the casting 86 is formed with a vertical slot 91 which is adapted to receive the horizontal arm 92 of the controlling member 93. The controlling member 93 is formed with the lugs 94 which are adapted to enter the notches formed in the side of the casting 86. The controlling member normally being held in these notches by means of a spring 95 mounted on the end of the arm 92 between the washers 96 and 97 which bear respectively against the end of the arm and the casting 86. The controlling member 93 has threaded engagement with the upper end of the rod 98, the lower end of this rod being pivotally mounted on the lug 84 of the latching member 79. A handle 99 is formed on the controlling member 93 to facilitate moving it from one position to another.

Figures 6, 7:
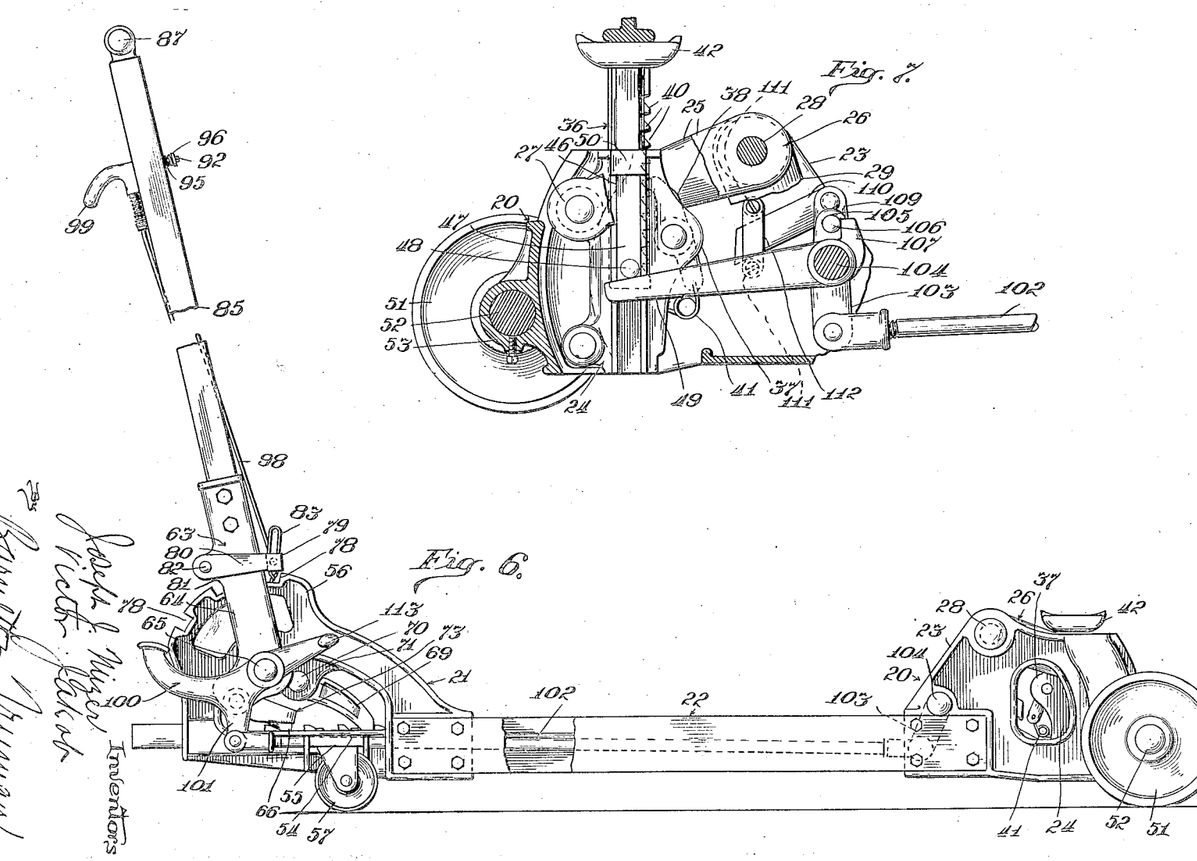
Fig. 6 is an elevational view of the side opposite to that shown in Fig. 1, the lifting member being in its lowermost position in the rack guide.
Fig. 7 is a side elevational view of the forward base, certain parts being in section and the lifting member elevated in the rack guide by means of the pedal control rod.
Figures 8, 9, 10:
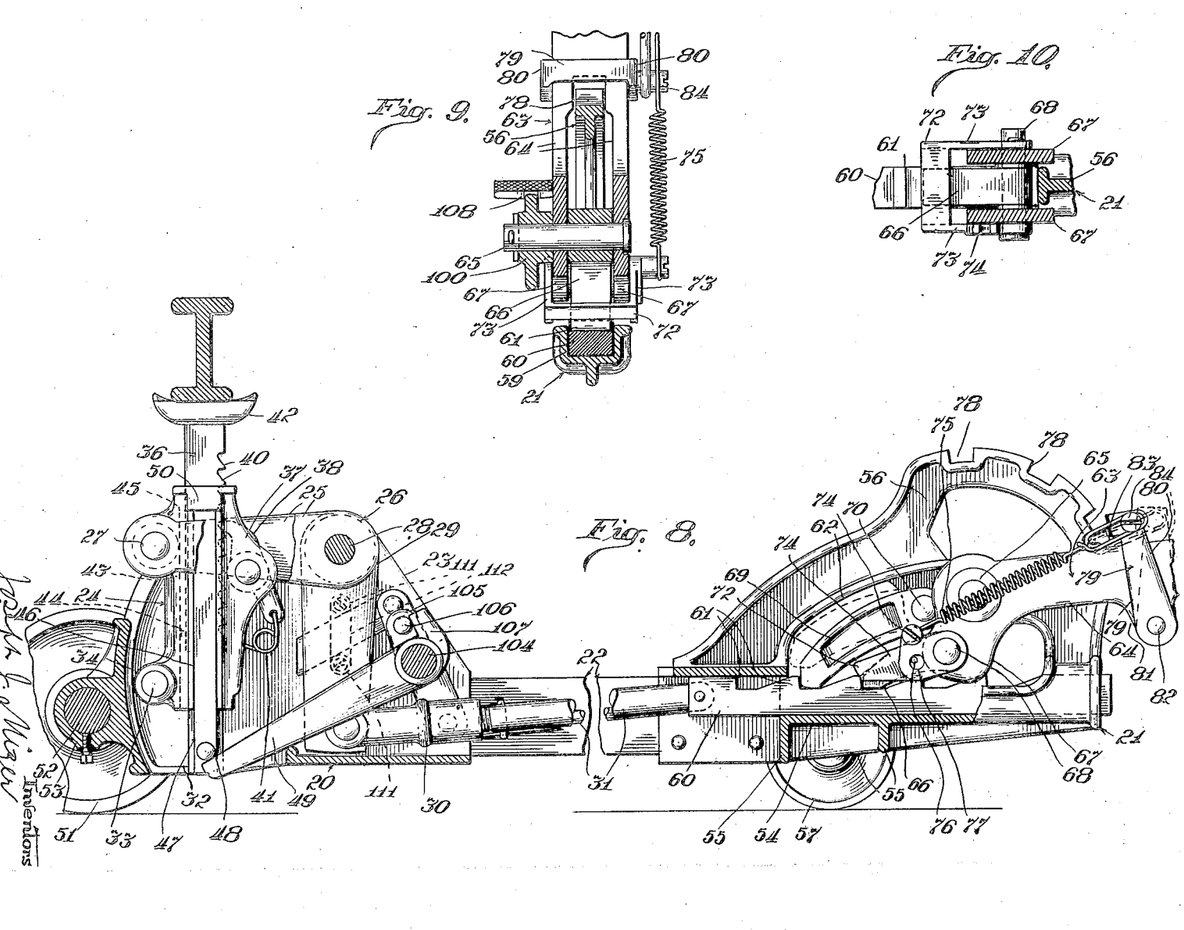
Figures 11, 12, 13, 14:
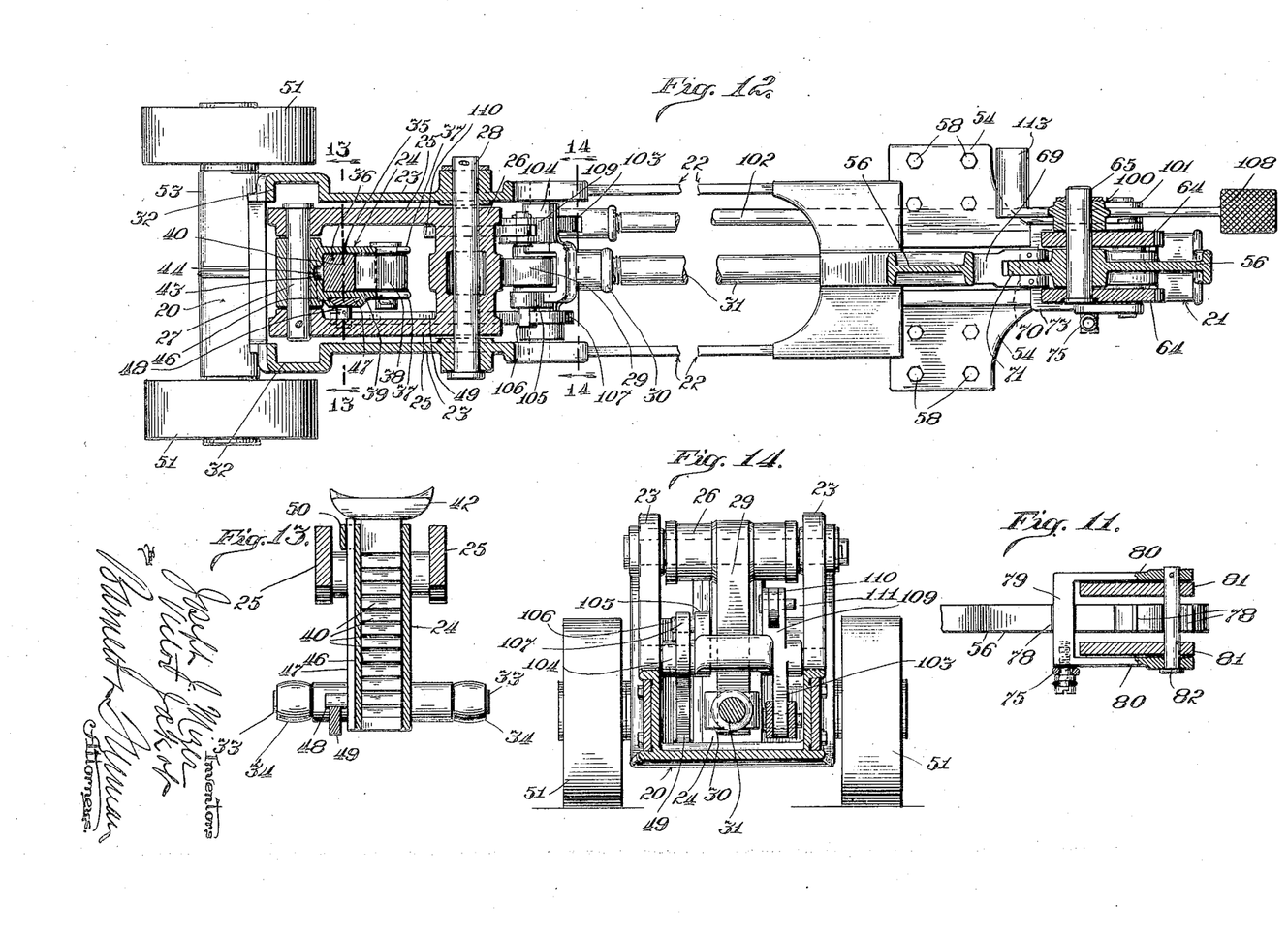

In order to enable the operator to take up quickly whatever lost motion there may be between the cap 42 of the lifting member and the load to be lifted preparatory to lifting the same with the hand operated lever 63, the jack is provided with a double acting foot lever 100 fulcrumed on the pin 65 and is provided with a depending arm 101 pivotally connected to the pedal control rod 102. The forward end of the pedal rod is pivotally connected to the arm 103 of the crank shaft 104 which is mounted between the side members 23 of the forward base. The crank shaft 104 is formed with an upstanding arm 105 which is provided with a laterally extending lug 106 which is adapted to engage the upstanding lug 107 of the rack-bar lifting lever 49 when the arm 108 of the foot pedal 100 is depressed for thrusting the pedal rod 102 forwardly, thereby causing the crank shaft 104 to rotate in a clockwise direction as seen in Figs. 1 and 8. This movement of the crank shaft causes the lifting lever 49 to be rotated on the crank shaft 104 thereby raising the lifting member 47, the cap 42 and the rack bar 36. The crank shaft 104 is provided also with another upstanding arm 109 to which the lever 110 is pivotally connected, this lever operating between two lugs 111 formed on the inner side of one of the side members 23 of the forward base, a keeper 112 being attached to the lugs 111 thereby forming a guide for the lever 110. When the pedal 113 of the foot lever 100 is depressed with the carriage 24 in its lowered position as shown in Figs. 1 and 7 the pedal rod 102 is moved backwardly thereby causing the crank shaft 104 to be rotated in a counter-clockwise direction in said Figs. 1 and 8 whereby the lever 110 is thrust forwardly into engagement with the lower end of the pawl 38 causing the pawl to be thrown out of engagement with the teeth on the rack-bar 36, thereby permitting the rack bar to drop.

Operation; When lifting a vehicle, for example, the jack is brought into position so that the cap 42 on the lifting bar 36 will be underneath the part of the vehicle to be engaged. The pedal 108 is then depressed which, as hereinbefore described, causes the rack bar 36 to be raised up to the axle or that part to be engaged (Fig. 7) the rack bar being retained in that position relative to the rack carriage by means of the pawl 38. The controlling member 93 is then adjusted so as to be in engagement in the notch 89 which raises the latching member 79 sufficiently to clear the notches 78 of the segment on the web member 56 in which position, however, the spring 75 attached to the lifting member 72 will not be under tension. The operating handle is then brought into the position shown in Fig. 8 which causes the lifting pawl 66 to push the rack bar 60 forwardly sufficiently to permit the holding pawl 69 to drop into engagement with the tooth just ahead of the one previously engaged by the lifting pawl. Forward movement of the rack bar 60 causes the connecting rod 31 to be moved forwardly thereby rotating the bell crank 29 in a clockwise direction in said Fig. 8 and raising the rack carriage 24 to the position shown in said figure, the rollers 34 operating in the guide ways 32 being effective to retain the rack carriage in a perpendicular position. Since the holding pawl is now in engagement with one of the teeth of the rack bar 60 the operating handle may be raised again to the position shown in Fig. 1 which permits the lifting pawl 66 to drop into engagement with the next tooth in the rear and the rack bar 60 may then be again pushed forwardly as just described, the holding pawl 69 again riding up over and dropping into engagement with the next tooth in the rear. The carriage 24 is thus moved upwardly step by step. The jack shown in the drawings is designed to permit three lifting operations by the operating handle. It will be obvious, however, that the mechanism mounted on the forward base may be designed and proportioned and a larger number of teeth formed on the rack bar 60 so that a considerably greater range of movement of the rack bar 36 and rack carriage 24 may be obtained, this being merely a matter of design and not departing from the principles of our invention.

When it is desired to lower the load, the controlling member 93 is lifted into engagement with the notch 88 which raises the latching member 79 so that the spring 75 is placed under tension resulting in the lifting member 72 being raised, which alternately raises pawls 69 and 66, the pawl 66 because of the engagement of its pin 76 with member 72. When the spring 75 is under tension and operating lever 63 is in the position shown in Fig. 1 the pawl 66 is lifted out of engagement with the teeth on the rack bar, the load being sustained by the holding pawl 69. The lever 63 is then lowered into the position shown in Fig. 8, the member 72 being then in engagement with the under surface of pawl 69 due to the action of spring 75, the pawl 66 is crowded downward against the tension of spring 75 and into engagement with the tooth just behind the one engaged by pawl 69. A slight further downward movement of lever 63 results in the load being transferred from pawl 69 to pawl 66. Because of the loose engagement of pin 76 in perforation 77 of member 72, the member 72 is pulled upwardly by spring 75 sufficiently to lift pawl 69 into the dotted line position so that it will pass over the tooth just ahead of it and as the lever 63 is raised member 72 is withdrawn from under pawl 69 and as the rack bar moves backwardly, pawl 69 drops down into engagement with the next tooth ahead. When the operating handle is then raised sufficiently, the load is transferred from pawl 66 to pawl 69, and the lowering operation just described may then be repeated, the rack carriage being permitted to descend step by step until the jack is freed of its load. The foot pedal may then be depressed which as hereinbefore described, trips the pawl 38 thereby permitting the rack bar 36 to descend to its initial position.

The jack is strong and since it is supported on rollers or casters it may be used for shifting disabled vehicles around in a garage, for example. The device provides a powerful leverage and enables the operator to handle a heavy load very easily and quickly. If desired, the handle of the jack may be raised and locked in upright position when the jack is supporting a load by adjusting the controlling member 93 so as to engage the notch 90.

It will be obvious that various modifications might be made in the jack without departing from the principles of our invention. We do not intend therefore to limit our invention to the constructions, arrangements and devices shown and described except only in so far as certain of the appended claims are specifically so limited.

We claim:

1. A lifting jack comprising in combination a frame, a horizontally extending arm pivotally mounted on a horizontal axis on said frame, a lifting member pivotally connected with said horizontal arm and adapted to swing up and down with the arm about the said axis, power means adapted by a plurality of operations to give said arm a step-by-step movement for carrying the lifting member upwardly, and means co-operating with said arm for holding the lifting member from swinging out of vertical position as it moves upwardly.

2. A lifting jack comprising in combination a frame, a horizontally extending arm pivotally mounted on a horizontal axis on said frame, a lifting member pivotally connected with said horizontal arm and adapted to swing up and down with the arm about the said axis, a rod slidably mounted on said frame, connections between said rod and said arm adapted upon a longitudinal movement of the rod to move said arm and said lifting member vertically, power means for moving said rod longitudinally, and means for maintaining said lifting member in elevated position for supporting a load.

3. A lifting jack comprising in combination a frame, a bell crank lever pivoted on said frame and having horizontally and downwardly extending arms, a lifting member pivotally connected near its upper end with said horizontal extending arm, a rod pivotally connected with said downwardly extending arm, power means mounted on said frame at a distance from the bell crank lever adapted through the medium of said rod to swing said bell-crank lever on its pivot for raising said lifting member, and means engaging the lower end portion of said lifting member below said horizontally extending arm for holding said lifting member from swinging out of vertical position on said frame.

4. A lifting jack comprising in combination, a frame, a bell crank pivoted in said frame, a load engaging member pivoted to one arm of said bell crank, power means associated with the other arm of said bell crank, whereby said bell crank may be oscillated and said member raised or lowered, said frame having a guideway, and a roller mounted on said member and adapted to engage said guideway, said guideway being curved and adapted to maintain said member perpendicularly during the raising and lowering thereof.

5. A lifting jack comprising in combination, a frame having two spaced side members, a bell crank pivoted between said members, a load engaging member pivoted to one arm of said bell crank, power means associated with the other arm of said bell crank whereby said bell crank may be oscillated and said load engaging member raised or lowered, said side members having guideways, and rollers on said load engaging member adapted to engage the respective guideways, said guideways being formed on a radius struck from a perpendicular line running through the axis of said bell crank and substantially equal to the radius of the arm of the bell crank to which said load engaging member is pivoted.

6. A vehicle jack comprising in combination, a horizontal frame, rollers adapted to support said frame, a bell crank having substantially horizontal and vertical arms pivotally mounted in one end of said frame, load engaging means mounted on the horizontal arm of said bell crank, and operating means connected to the lower end of the vertical arm of said bell crank and operable from the other end of said frame whereby said bell crank may be oscillated and said load engaging means raised and lowered, the middle portion of said frame and said operating means being arranged relatively close to the ground whereby said frame may be swung around under the wheels of the vehicle when the same is raised.

7. A lifting jack comprising in combination, a horizontal frame, a bell crank pivoted in one end of said frame, a carriage pivoted to one arm of said bell crank, a rack bar adjustably associated with said carriage, power means mounted in the other end of said frame and associated with the other arm of said bell crank whereby said bell crank may be oscillated and said carriage and rack bar raised or lowered, and means adapted to maintain said carriage perpendicular during the raising and lowering thereof.

8. A lifting jack comprising in combination, a horizontal frame, a bell crank pivoted in one end of said frame, a carriage associated with one arm of said bell crank, a rack bar adjustably associated with said carriage, power means mounted in the other end of said frame and associated with the other arm of said bell crank whereby said bell crank may be oscillated and said carriage and rack bar raised or lowered, and means for raising said rack bar relative to said carriage.

9. A lifting jack comprising in combination, a horizontal frame, a bell crank pivoted in one end of said frame, a carriage associated with one arm of said bell crank, a rack bar adjustably associated with said carriage, power means mounted in the other end of said frame and associated with the other arm of said bell crank whereby said bell crank may be oscillated and said carriage and rack bar raised or lowered, and means for raising or lowering said rack bar relative to said carriage.

10. A lifting jack comprising in combination, a horizontal frame, a bell crank pivoted in one end of said frame, a carriage associated with one arm of said bell crank, a rack bar slidably associated with said carriage, a pawl pivoted on said carriage and adapted to engage the teeth on said rack bar, power means mounted in the other end of said frame and associated with the other arm of said bell crank whereby said bell crank may be oscillated and said carriage and rack bar raised or lowered, means for raising said rack bar relative to said carriage, and means for tripping said pawl thereby permitting it to drop relative to said carriage.

11. A lifting jack comprising in combination, a frame, a bell crank pivoted in said frame, a carriage associated with one arm of said bell crank, a rack bar slidably associated with said carriage, a pawl pivoted on said carriage and adapted to engage the teeth on said rack bar, power means associated with the other arm of said bell crank whereby said bell crank may be oscillated and said carriage and rack bar raised or lowered, and unitary means which when moved into one position causes said rack bar to be raised relative to said carriage and when moved into another position causes said pawl to be tripped thereby permitting said rack bar to drop relative to said carriage.

12. A lifting jack comprising in combination, a frame, a bell crank pivoted in said frame, a carriage associated with one arm of said bell crank, a rack bar slidably associated with said carriage, a pawl pivoted on said carriage and adapted to engage the teeth on said rack bar, power means associated with the other arm of said bell crank whereby said bell crank may be oscillated and said carriage and rack bar raised or lowered, a crank shaft journaled in said frame, means to oscillate said shaft, means associated with said shaft and adapted upon oscillation thereof in one direction to raise said rack bar relative to said carriage, and means associated with said shaft and adapted upon oscillation thereof in the other direction to trip said pawl thereby permitting said rack bar to drop relative to said carriage.

13. A lifting jack comprising in combination, a frame, a bell crank pivoted in said frame, a carriage associated with one arm of said bell crank, a rack bar slidably associated with said carriage, a pawl pivoted on said carriage and adapted to engage the teeth on said rack bar, power means associated with the other arm of said bell crank whereby said bell crank may be oscillated and said carriage and rack bar raised or lowered, a crank shaft journaled in said frame, double acting means adapted to oscillate said shaft, a lifting member associated with said shaft and adapted upon oscillation thereof in one direction to raise said rack bar relative to said carriage, and a lever associated with said shaft and adapted upon oscillation thereof in the other direction to trip said pawl thereby permitting said rack bar to drop relative to said carriage.

14. In a jack having a horizontal frame, the combination of a lifting member mounted in the forward end of said frame, a rack bar slidably associated with said member, and means, operable by a single control member mounted in the rearward end of said frame, adapted to raise or lower said rack bar relative to said lifting member.

15. In a jack having a horizontal frame, the combination of a lifting member mounted in the forward end of said frame, a rack bar slidably associated with said member, a crank shaft journaled in said frame, means mounted in the rearward end of said frame and adapted to oscillate said shaft, means associated with said shaft and adapted upon oscillation thereof in one direction to raise said rack bar relative to said member, and means associated with said shaft and adapted upon oscillation thereof in the other direction to permit said rack bar to drop relative to said member.

16. In a jack having a lifting member mounted in the frame thereof, the combination of a rack bar slidably associated with said member, a pawl pivoted to said member and adapted to engage said rack bar, a crank shaft mounted in said frame, a double acting foot pedal mounted on said frame and operatively connected to said shaft, means associated with said shaft and adapted to raise said rack bar relative to said member when the foot pedal is actuated in one direction, and means associated with said shaft and adapted to trip said pawl when the foot pedal is actuated in the opposite direction whereby said rack bar is lowered relative to said member.

17. In a jack having a lifting carriage mounted in the frame thereof, the combination of a rack bar slidably associated with said carriage, a pawl pivoted to the carriage and adapted to engage said rack bar, a crank shaft mounted in said frame and operated by a control lever, a lever associated with said shaft and adapted to engage the rack bar when said control lever is moved in one direction whereby said rack bar is raised relative to said carriage, and a member associated with said shaft and adapted to trip said pawl when the control lever is moved in the opposite direction whereby said rack bar is lowered relative to said carriage.

18. A lifting jack comprising in combination, a horizontal frame, a lifting member mounted in one end of said frame, a rack bar slidably associated with said member, means operable by a single control rod adapted to raise or lower the rack bar relative to said member, and means adapted to raise or lower said member relative to said frame, both said means being operable from the other end of said frame.

19. A lifting jack comprising in combination, a horizontal frame, a bell crank pivoted in one end of said frame, a lifting member associated with one arm of said bell crank, a rack bar slidably associated with said member, power means associated with the other arm of said bell crank and adapted to oscillate said bell crank, thereby raising or lowering said member relative to said frame, and means adapted to raise or lower said rack bar relative to said member, both said means being operable from the other end of said frame.

20. A lifting jack comprising in combination, a horizontal frame, a bell crank pivoted in one end of said frame, a lifting member associated with one arm of said bell crank, a rack bar slidably associated with said member, a lever fulcrumed on the other end of said frame and operatively connected to the other arm of said bell crank, whereby said bell crank may be oscillated and said member raised or lowered relative to said frame, and double acting means mounted in the last mentioned end of said frame, associated with said rack bar and adapted to raise or lower the same relative to said member.

21. A lifting jack comprising a horizontal frame, a load engaging member mounted in one end of said frame, a rack bar mounted in the other end of said frame, means connecting said rack bar with said member, and means adapted to move said rack bar step by step whereby said member may be raised or lowered.

22. A lifting jack comprising in combination, a horizontal frame, a bell crank pivoted in the forward end of said frame, a load engaging member associated with one arm of said bell crank, a rack bar associated with the other arm of said bell crank, and power means operated from the rearward end of said frame and associated with said rack bar, whereby said bell crank may be oscillated and said member raised or lowered step by step.

23. In a lifting jack having a horizontal frame, the combination of a bell crank pivotally mounted in the forward end of said frame, a lifting member pivoted to one arm of said bell crank and guided in said frame, a rack bar slidably mounted in the rearward end of said frame and connected to the other arm of said bell crank, and a lever fulcrumed in the rearward end of the frame and adapted to engage said rack bar to move it forwardly thereby raising said lifting member.

24. In a lifting jack having a horizontal frame, the combination of a bell crank pivotally mounted in the forward end of said frame, a lifting member pivoted to one arm of said bell crank and guided in said frame, a rack bar slidably mounted in the rearward end of said frame and connected to the other arm of said bell crank, a lever fulcrumed in the rearward end of the frame and adapted to engage said rack bar to move it forwardly thereby raising said lifting member, and means to prevent said rack bar from slipping backwardly while said lever is being positioned for a further movement of said rack bar.

25. In a lifting jack having a horizontal frame, the combination of a bell crank pivotally mounted in the forward end of said frame, a lifting member pivoted to one arm of said bell crank and guided in said frame, a rack bar slidably mounted in the rearward end of said frame and connected to the other arm of said bell crank, a lever fulcrumed in the rearward end of the frame and having a pawl adapted to engage the teeth on said rack bar whereby said rack bar may be moved forwardly and said lifting member raised, and a pawl pivoted to said frame and adapted to engage the teeth on said rack bar to prevent backward movement of said rack bar while said lever is being positioned for further forward movement of said rack bar.

26. In a lifting jack having a horizontal frame, the combination of a bell crank pivotally mounted in the forward end of said frame, a lifting member pivoted to one arm of said bell crank and guided in said frame, a rack bar slidably mounted in the rear end of said frame and connected to the other arm of said bell crank, a bell crank operating lever fulcrumed in the rearward end of the frame having a pawl pivoted to the power arm thereof and adapted to engage the teeth on said rack bar whereby said rack bar may be moved forwardly and said lifting member raised, and a pawl pivoted to said frame and adapted to engage the teeth on said rack bar to prevent backward movement thereof while said operating lever is being positioned for further forward movements of said rack bar.

27. In a lifting jack having a horizontal frame, the combination of a bell crank pivotally mounted in the forward end of said frame, a lifting member pivoted to one arm of said bell crank and guided in said frame, a rack bar slidably mounted in the rearward end of said frame and connected to the other arm of said bell crank, a bell crank operating lever fulcrumed in the rearward end of said frame and having a pawl pivoted thereto adapted to engage the teeth on said rack bar whereby said rack bar may be moved forwardly and said lifting member raised, holding means to prevent backward movement of said rack bar while said lever is being positioned for further lifting movements, and automatic means adapted to alternately release said holding means and lift said pawl when said lever is operated, thereby lowering said lifting member.

28. In a lifting jack having a horizontal frame, the combination of a bell crank pivotally mounted in the forward end of said frame, a lifting member pivoted to one arm of said bell crank and guided in said frame, a rack bar slidably mounted in the rearward end of said frame and connected to the other arm of said bell crank, a bell crank operating lever fulcrumed in the rearward end of said frame and having a lifting pawl pivoted on the power arm thereof and adapted to engage the teeth on said rack bar whereby said rack bar may be moved forwardly and said lifting member raised, a holding pawl pivoted to said frame and adapted to prevent backward movement of said rack bar while said lever is being positioned for further lifting movements, and automatic means adapted to alternately lift said pawls when said lever is operated, thereby lowering said lifting member.

29. In a lifting jack having a horizontal frame, the combination of a bell crank pivotally mounted in the forward end of said frame, a lifting member pivoted to one arm of said bell crank and guided in said frame, a rack bar slidably mounted in the rearward end of said frame and connected to the other arm of said bell crank, a bell crank operating lever fulcrumed in the rearward end of said frame and having a lifting pawl pivoted on the power arm thereof and adapted to engage the teeth on said rack bar whereby said rack bar may be moved forwardly and said lifting member raised, a holding pawl pivoted to said frame-work and adapted to prevent backward movement of said rack bar while said lever is being positioned for further lifting movements, and means pivoted to said lever which, when said lever is operated to sustain the load, lifts said holding pawl over the tooth previously engaged and as the operating lever is reversed and the rack bar moved backwardly permits it to engage the next forward tooth.

30. In a lifting jack having a horizontal frame, the combination of a bell crank pivotally mounted in the forward end of said frame, a lifting member pivoted to one arm of said bell crank and guided in said frame, a rack bar slidably mounted in the rearward end of said frame and connected to the other arm of said bell crank, an operating lever fulcrumed in the rearward end of said frame and having a pawl pivoted thereto adapted to engage the teeth on said rack bar whereby said rack bar may be moved forwardly and said lifting member raised, a holding pawl pivoted to said frame and adapted to prevent backward movement of said rack bar while said lever is being positioned for further lifting movements, a pivoted lever, and means whereby said pivoted lever is lifted to raise said holding pawl when said operating lever is positioned to sustain the load whereby said holding pawl is positioned to engage the next forward tooth of the rack bar when the operating lever is reversed to lower the load.

31. In a lifting jack having a horizontal frame, the combination of a bell crank pivotally mounted in the forward end of said frame, a lifting member pivoted to one arm of said bell crank and guided in said frame, a rack bar slidably mounted in the rearward end of said frame and connected to the other arm of said bell crank, a bell crank operating lever fulcrumed in the rearward end of said frame and having a lifting pawl pivoted on the power arm thereof and adapted to engage the teeth on said rack bar whereby said rack bar may be moved forwardly and said lifting member raised, a holding pawl pivoted to said frame and adapted to prevent backward movement of said rack bar while said lever is being positioned for further lifting movements, a lever adapted to engage said holding pawl and pivoted to the power arm, a controlling member mounted on the operating arm of said bell crank operating lever, and a spring connection between said pivoted lever and said controlling member whereby said holding pawl is positioned to engage the next forward tooth on the rack bar when the operating lever is reversed to lower the load.

32. In a lifting jack having a horizontal frame, the combination of a bell crank pivotally mounted in the forward end of said frame, a lifting member pivoted to one arm of said bell crank and guided in said frame, a rack bar slidably mounted in the rearward end of said frame and connected to the other arm of said bell crank, a bell crank operating lever fulcrumed in the rearward end of said frame and having a lifting pawl pivoted on the power arm thereof and adapted to engage the teeth on said rack bar whereby said rack bar may be moved forwardly and said lifting member raised, a holding pawl pivoted to said frame and adapted to prevent backward movement of said rack bar while said lever is being positioned for further lifting movements, a pivoted lever adapted to alternately lift said pawls, and a controlling member mounted on the operating arm of said bell crank lever and connected to said pivoted lever which controlling member in one position causes said operating lever to raise and in another position to lower the load.

33. In a lifting jack having a horizontal frame, the combination of a bell crank pivotally mounted in the forward end of said frame, a lifting member pivoted to one arm of said bell crank and guided in said frame, a rack bar slidably mounted in the rearward end of said frame and connected to the other arm of said bell crank, an operating lever fulcrumed in the rearward end of said frame and having a pawl pivoted thereto, a holding pawl pivoted on said frame, each pawl being adapted to engage the teeth on said rack bar, and controlling and actuating means which when set in one position causes the rack bar to move forwardly step by step and when set in another position causes it to move backwardly step by step when the operating lever is manipulated.

34. A lifting jack comprising in combination a horizontal frame, a bell crank pivoted in one end of said frame, a load engaging member mounted on one arm of said bell crank, a rack bar mounted in said frame and operatively connected to the other arm of said bell crank, power means associated with said rack bar whereby said member may be moved step by step, and means which is adapted when set in one position to cause said power means when operated to raise said member, and when set in another position, to cause said power means when operated to lower said member.

35. A lifting jack comprising in combination a horizontal frame, a load engaging member mounted in one end of said frame, a rack bar mounted in said frame, lifting means connecting said rack bar with said member, power means associated with and adapted to move said rack bar relative to said frame, and means which is adapted when set in one position to cause said power means when operated to move said rack bar in one direction thereby raising said member, and when set in another position to cause said power means when operated to move said rack bar in the opposite direction thereby lowering said member.

36. A lifting jack comprising in combination a horizontal frame, a bell crank pivoted in said frame, a load engaging member mounted on one arm of said bell crank, a rack bar mounted in said frame and operatively connected to the other arm of said bell crank, power means associated with said rack bar whereby said member may be moved step by step, and controlling means which when inoperative permit said power means when operated to raise said member, and when operative causes said power means when operated to lower said member.

37. A lifting jack comprising in combination a horizontal frame, a load engaging member mounted in one end of said frame, a rack bar mounted in said frame, lifting means connecting said rack bar with said member, power means associated with and adapted to move said rack bar relative to said frame, and controlling means which when inoperative causes said power means when operated to move said rack bar in one direction thereby raising said member, and when operative causes said power means when operated to move said rack bar in the opposite direction thereby lowering said member.

38. A lifting jack comprising in combination a horizontal frame, a bell crank pivoted in said frame, a load engaging member mounted on one arm of said bell crank, a rack bar mounted in said frame and operatively connected to the other arm of said bell crank, power means, mechanism associated with said power means and said rack bar whereby said member is lifted when said power means is operated, and reversing means associated with said mechanism and adapted to cause said mechanism to lower said member when said power means is operated.

39. A lifting jack comprising in combination a horizontal frame, a load engaging member mounted in one end of said frame, a rack bar slidably mounted in said frame, lifting means connecting said rack bar with said member, power means, mechanism associated with said power means and said rack bar whereby said rack bar is moved in one direction and said member is lifted when said power means is operated, and reversing means associated with said mechanism and adapted to cause said mechanism to move said rack bar in the opposite direction thereby lowering said member when said power means is operated.

40. A lifting jack comprising in combination a horizontal frame, a load engaging member mounted in one end of said frame, a rack bar mounted in the other end of said frame, lifting means associated with said member and said rack bar, a holding pawl engaging said rack bar, power means, a pawl pivoted to said power means and engaging said rack bar whereby said member may be lifted when said power means is operated, and means for alternately lifting said pawls whereby said member may be lowered when said power means is operated.

41. A lifting jack comprising in combination a frame, a load engaging member mounted in said frame, a rack bar mounted in the other end of said frame, lifting mechanism associated with said member and said rack bar, a holding pawl engaging said rack bar, power means, a lifting pawl pivoted to said power means and engaging said rack bar whereby said member may be lifted when said power means is operated, and spring actuated mechanism for alternately lifting said pawls when said power means is operated whereby said members may be lowered.

42. A lifting jack comprising in combination a frame, a load engaging member mounted in said frame, a rack bar mounted in said frame, lifting mechanism associated with said member and said rack bar, a holding pawl engaging said rack bar, power means, a lifting pawl pivoted to said power means and engaging said rack bar whereby said member may be lifted when said power means is operated, a lifting member associated with said pawls, a spring normally inoperative and associated with said lifting member, and means to make said spring effective, whereby said pawls are alternately lifted when said power means is operated, thereby lowering the load engaging member.

43. A lifting jack comprising in combination a frame, a load engaging member mounted in said frame, a rack bar mounted in said frame, lifting mechanism associated with said member and said rack bar, a holding pawl engaging said rack bar, an operating lever pivoted on said frame, a lifting pawl pivoted to said lever, and engaging said rack bar whereby said member may be lifted when said lever is operated, a lifting member associated with said pawl, a spring normally inoperative and associated with said lifting member, and means to make said spring effective whereby said operating lever may be positioned so that the lifting pawl will sustain the load, whereupon said spring causes said lifting member to lift said holding pawl over one tooth of said rack bar and permits it to come into engagement with the tooth next ahead as the operating lever is operated to lower the load engaging member.

44. A lifting jack comprising in combination a frame, a load engaging member mounted in said frame, a rack bar mounted in said frame, lifting mechanism associated with said member and said rack bar, a holding pawl engaging said rack bar, an operating lever pivoted on said frame, a lifting pawl engaging said rack bar, a lifting member connected to said lifting pawl, said lifting pawl and lifting member being pivoted on said operating lever, a spring associated with said lifting member and normally inoperative, and means to make said spring operative, said lifting member being adapted to lift said holding pawl when said lifting pawl engages the tooth on said rack bar next behind the one engaged by the holding pawl whereby when said operating lever is manipulated said load engaging member is raised when said spring is inoperative and lowered when it is operative.

45. A lifting jack comprising in combination a frame, a load engaging member mounted in said frame, a rack bar mounted in said frame, lifting mechanism associated with said member and said rack bar, a holding pawl engaging said rack bar, an operating lever pivoted on said frame, a lifting pawl engaging said rack bar, a U-shaped lifting member connected to said lifting pawl, said lifting pawl and said lifting member being pivoted on said lever, said lifting member having limited movement relative to said lifting pawl, a spring normally inoperative and associated with said lifting member, and means to make said spring operative, said lifting member being adapted to lift said holding pawl when said lifting pawl engages the tooth on said rack bar next behind the one engaged by the holding pawl whereby when said operating lever is manipulated, said load engaging member is raised when said spring is inoperative, and lowered when it is operative.

46. A lifting jack comprising in combination a frame, a load engaging member mounted in one end of said frame, a rack bar mounted in the other end of said frame, lifting mechanism associated with said member and said rack bar, a holding pawl engaging said rack bar, an operating lever pivoted on said frame, a lifting pawl pivoted on said lever and engaging said rack bar, controlling mechanism associated with said pawls, and a two-position controlling device associated with said mechanism whereby when said operating lever is manipulated and said control device is set in one position, said pawls move to raise the load engaging member, and when said control device is set in the other position, said pawls move to lower the load engaging member.

47. A lifting jack comprising in combination a frame, a load engaging member mounted in said frame, a rack bar mounted in said frame, lifting mechanism associated with said member and said rack bar, a holding pawl engaging said rack bar, an operating lever pivoted on said frame, a lifting pawl pivoted on said lever and engaging said rack bar, a lifting member associated with said pawls, a spring associated with said lifting member, and a two-position control device associated with said spring, whereby when said operating lever is manipulated and said control device is set in one position, said pawls move to raise the load engaging member and when said control device is set in the other position, said pawls move to lower the load engaging member.

48. A lifting jack comprising in combination a frame, a load engaging member mounted in said frame, a rack bar mounted in said frame, lifting mechanism associated with said member and said rack bar, a holding pawl engaging said rack bar, an operating lever pivoted on said frame, a lifting pawl pivoted on said lever and engaging said rack bar, a lifting member associated with said pawls, said frame having a segment engaging said operating lever, a locking member on said operating lever and adapted to engage said segment, a spring connecting said lifting member and said locking member, and a three-position control device associated with said locking member, whereby when said operating lever is manipulated and said control device is set in one position said pawls move to raise the load engaging member, when said control device is set in another position said pawls move to lower the load engaging member, and when said control device is set in its third position said operating lever is locked to said frame.

49. In a lifting jack of the class described, the combination of a rack bar slidably mounted in the frame thereof, an operating lever fulcrumed on said frame and having a pawl pivoted thereto, a holding pawl pivoted to said frame, each pawl being adapted to engage the teeth on said rack bar, said frame having a notched segment adjacent said operating lever, a locking member pivoted to said operating lever and adapted to engage said segment, and a three position controlling device on said operating handle which, when set in one position causes said rack bar to move in one direction step by step, when in another position causes it to move in the opposite direction step by step and when in the third position locks said lever to said frame.

50. A vehicle jack comprising in combination a horizontal frame, rollers adapted to support said frame, a bell crank having substantially horizontal and vertical arms mounted in the forward end of said frame, a load engaging member mounted on the horizontal arm of said bell crank, a rack bar mounted in the rearward end of said frame, means operatively connecting said rack bar to the vertical arm of said bell crank, and operating mechanism mounted on the rearward end of said frame and adapted to move said rack bar in either direction, whereby said load engaging member may be raised or lowered step by step, the middle portion of said frame and the means connecting the rack bar to the vertical arm of the bell crank being arranged relatively close to the ground whereby said frame may be swung around under the wheels of the vehicle when the same is raised.

51. In a lifting jack having a horizontal frame comprising forward and rearward bases spaced apart and secured together by connecting bars, the combination of a bell crank pivotally mounted in the forward base, a carriage pivoted to one arm of said bell crank, a rack bar slidably mounted in said carriage, a pawl pivoted to said carriage and adapted to engage said rack bar, means mounted on said forward base connected to a double acting control pedal pivoted on the rear base whereby said rack bar may be raised by actuating said pedal in one direction and lowered by actuating the pedal in the other direction, and an operating lever pivoted on said rear base and connected to the other arm of said bell crank whereby said carriage and rack bar may be lifted and lowered.

52. A jack comprising a horizontally extending frame, carrying wheels supporting said frame, a horizontally extending arm pivotally mounted on one end portion of said frame, a lifting member pivotally connected with said arm, a load supporting member revolubly mounted on a vertical axis on said lifting member, a lever mounted on said frame at a distance from said lifting member, and operative connections between said lever and said arm for giving said arm a vertical swinging movement for carrying said load-supporting member upwardly with respect to said frame.

53. A vehicle roller jack comprising a horizontally extending frame, carrying wheels supporting said frame, a horizontally extending arm pivotally mounted on one end portion of said frame, a lifting member pivotally connected with said arm, a load-supporting member revolubly mounted on a vertical axis on said lifting member, power means mounted on said frame independently of said arm adapted by a plurality of actuations to give the arm a step-by-step vertical swinging movement for carrying said load-supporting member upwardly with respect to said frame, and means for holding said lifting member in vertical position on said frame as the lifting member is moved upwardly by said arm.

54. A vehicle roller jack comprising a horizontally extending frame, carrying wheels supporting said frame, a load supporting member revolubly mounted on a vertical axis on said frame, a rod slidable longitudinally of said frame, means actuated by longitudinal movement of said rod in one direction for raising said load supporting member with respect to said frame, and power means mounted on said frame at a distance from said load supporting member adapted by a plurality of operative strokes to give said rod a step-by-step movement for raising said load supporting member.

JOSEPH J. MIZER.
VICTOR JAKOB.